United States Patent [19]

Mueller et al.

[11] Patent Number: 4,924,839

[45] Date of Patent: May 15, 1990

[54] SUPERCHARGER WITH TORSION DAMPING

[75] Inventors: Robert S. Mueller, Birmingham; Kevin M. McGovern, Dearborn Heights, both of Mich.

[73] Assignee: Eaton Corporation, Cleveland, Ohio

[21] Appl. No.: 200,330

[22] Filed: May 31, 1988

[51] Int. Cl.[5] .............................................. F02B 33/38
[52] U.S. Cl. .................................. 123/559.1; 464/57; 464/160
[58] Field of Search .............. 123/559.1; 418/69, 182, 418/201, 206; 464/57, 66, 67, 77, 160

[56] References Cited

U.S. PATENT DOCUMENTS

| 1,331,090 | 2/1920 | Bijur | 464/57 X |
|---|---|---|---|
| 1,431,401 | 10/1922 | Hupp | 464/57 |
| 1,705,984 | 3/1929 | Lindsay | 464/57 |
| 2,963,006 | 12/1960 | Karde | 123/559.1 X |
| 2,989,857 | 6/1961 | Helland et al. | |
| 3,195,324 | 7/1965 | Sellwood et al. | |
| 3,236,066 | 2/1966 | Fredrickson | 464/77 |
| 4,171,627 | 10/1979 | Fukuda | |
| 4,565,345 | 1/1986 | Mueller | 418/206 |
| 4,638,570 | 1/1987 | Soeters | 33/562 |

FOREIGN PATENT DOCUMENTS 630179 5/1936 Fed. Rep. of Germany ...... 464/160

*Primary Examiner*—Michael Koczo
*Attorney, Agent, or Firm*—P. S. Rulon

[57] ABSTRACT

An intake manifold (18) for an engine (10) includes a Roots-type supercharger (26) having a torsion damping mechanism (54) for reducing audible rattle of timing gears (72,74) which prevent contact of meshed lobes (28a,29a) of the supercharger rotors (28,29).

11 Claims, 3 Drawing Sheets

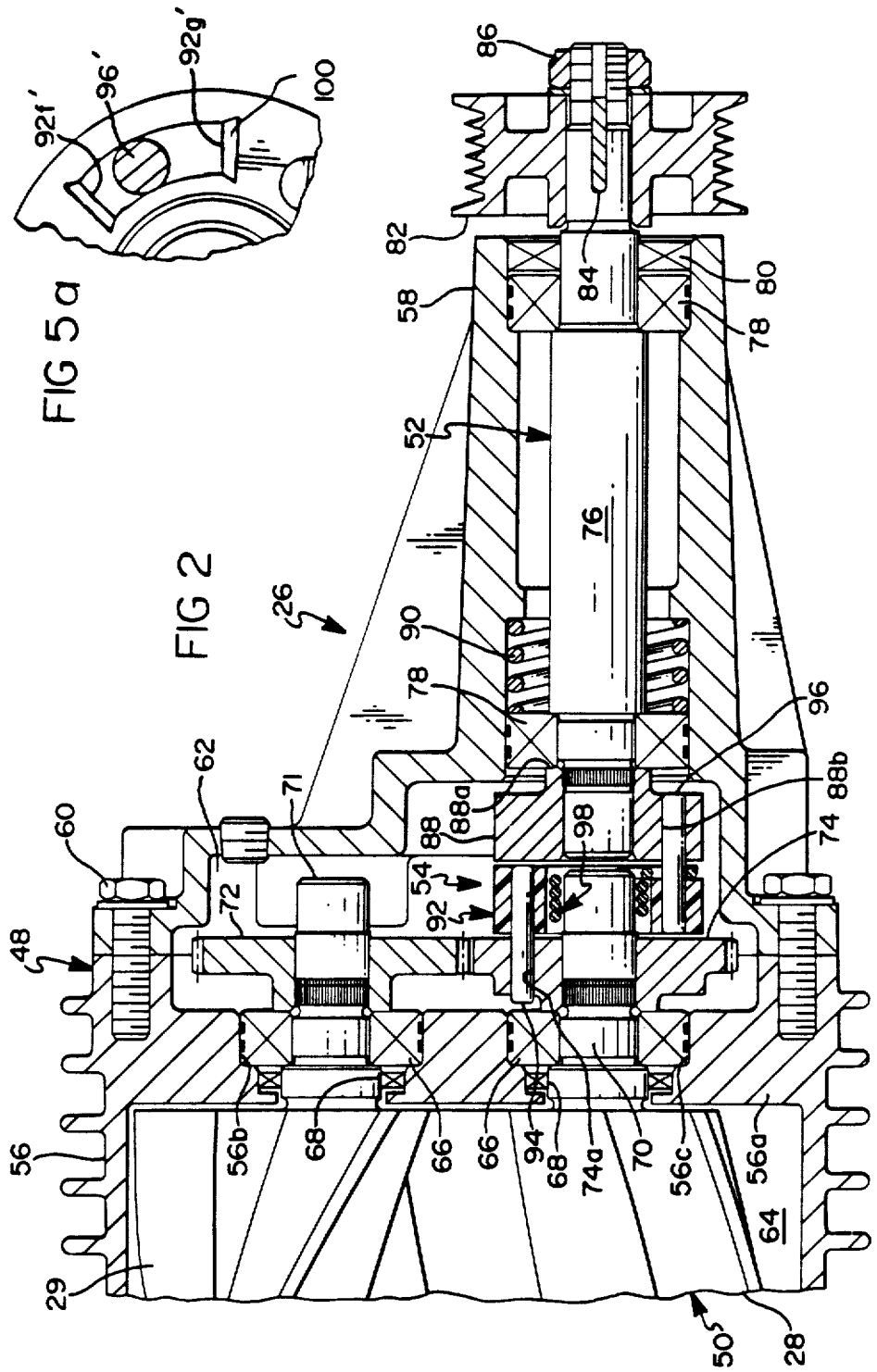

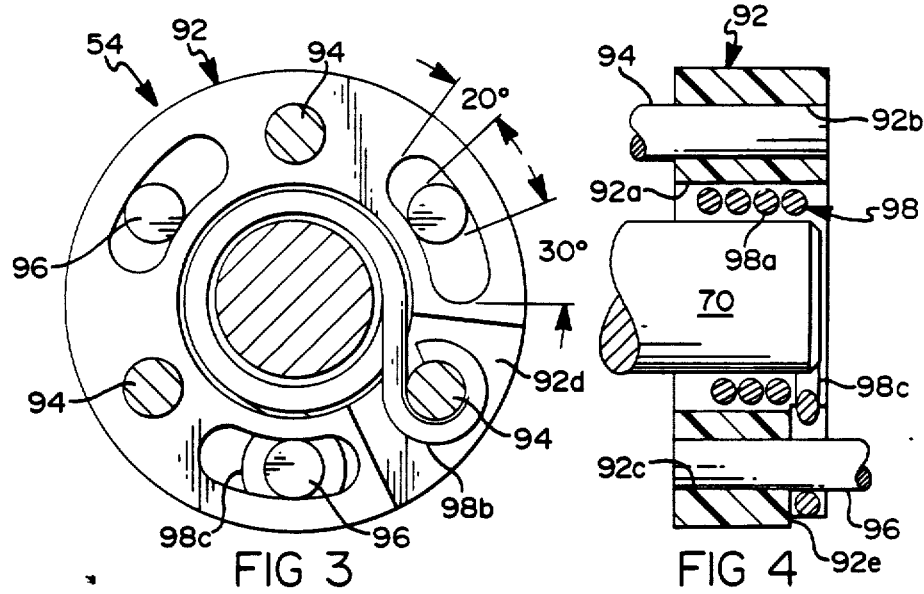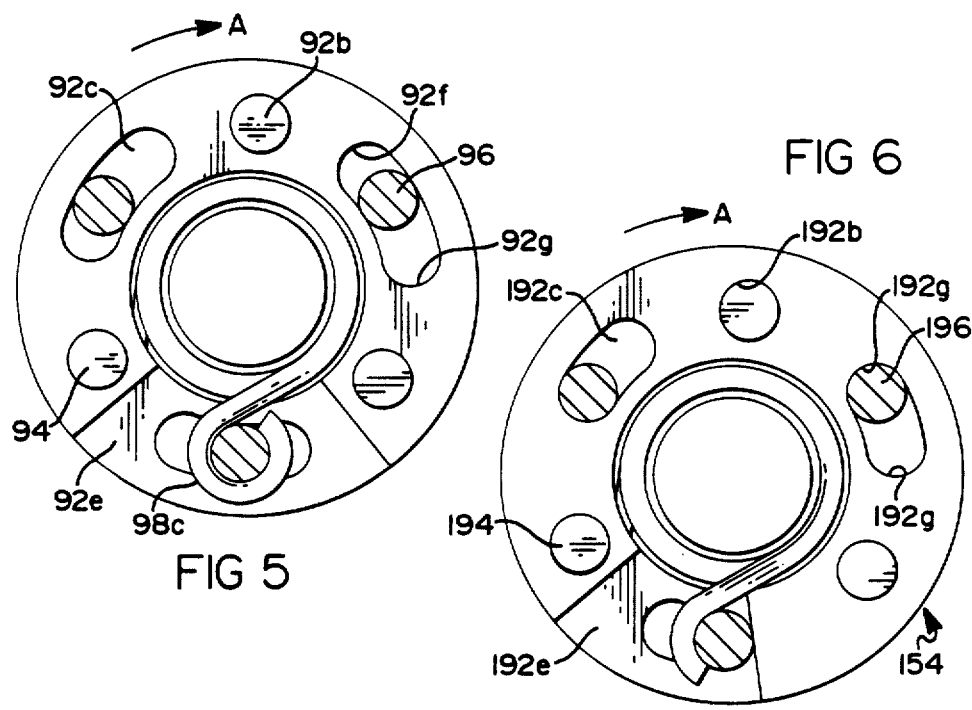

SUPERCHARGER WITH TORSION DAMPING

FIELD OF THE INVENTION

This invention relates to rotary compressors or blowers, particularly to blowers of the backflow type. More specifically, the present invention relates to a shaft coupling for reducing airborne noise associated with Roots-type blowers employed as superchargers for internal combustion engines.

BACKGROUND OF THE INVENTION

Rotary blowers of the backflow-type, particularly Roots-type blowers are characterized by noisy operation. Roots-type blower noise may be roughly classified into two groups: solid borne noise caused by rotation of timing gears and rotor shaft bearings subjected to fluctuating loads, and fluid borne noise caused by fluid flow characteristics such as rapid changes in fluid velocity. The invention of this application is concerned with solid borne noise caused by timing gear rattle.

The timing gears of the Roots-type blowers, such as the blower disclosed in U.S. Pat. No. 4,638,570, are known to produce an objectionable gear rattle when the meshed teeth of the gears are substantially unloaded. Such an unloaded condition occurs during non-supercharging, low engine speed operation.

SUMMARY OF THE INVENTION

An object of this invention is to negate objectional rattle noise produced by the timing gears in a Roots-type blower.

According to a feature of the invention a rotary blower of the backflow type, such as disclosed in U.S. Pat. No. 4,638,570, includes a housing; at least first and second rotors rotatably disposed in the housing and having meshed lobes for transferring relatively low pressure inlet port air to outlet port air controllable between relatively low and high pressures; first and second meshed timing gears respectively fixed to the first and second rotors for preventing contact of the meshed lobes; an input drive adapted to be rotatably driven about an axis in one direction by and at speeds proportional to the speed of a periodic combustion, torque transmitting engine selectively controllable between relatively low and high speeds.

The blower is characterized by a torsion damping mechanism including drive means driven by the input drive and mounted for limited rotation relative to the first timing gear, resilient means drivingly interposed between the drive means and the first timing gear, and the resilient means being flexibly operative to attenuate input drive torsionals in the torque and thereby reduce timing gear rattle.

BRIEF DESCRIPTION OF THE DRAWINGS

The supercharger and torsion damping mechanism of the present invention is shown in the accompanying drawings in which:

FIG. 2 is a partial, sectional view of the supercharger;

FIGS. 3-5 are detailed views of a torsion damping mechanism in FIG. 2.

FIG. 5a is a modified fragmentary view of the damping mechanism of FIG. 5.

FIG. 6 is a detailed view of an alternative embodiment of the damping mechanism in FIGS. 3-5.

DETAILED DESCRIPTION OF THE DRAWINGS

Figure 1:
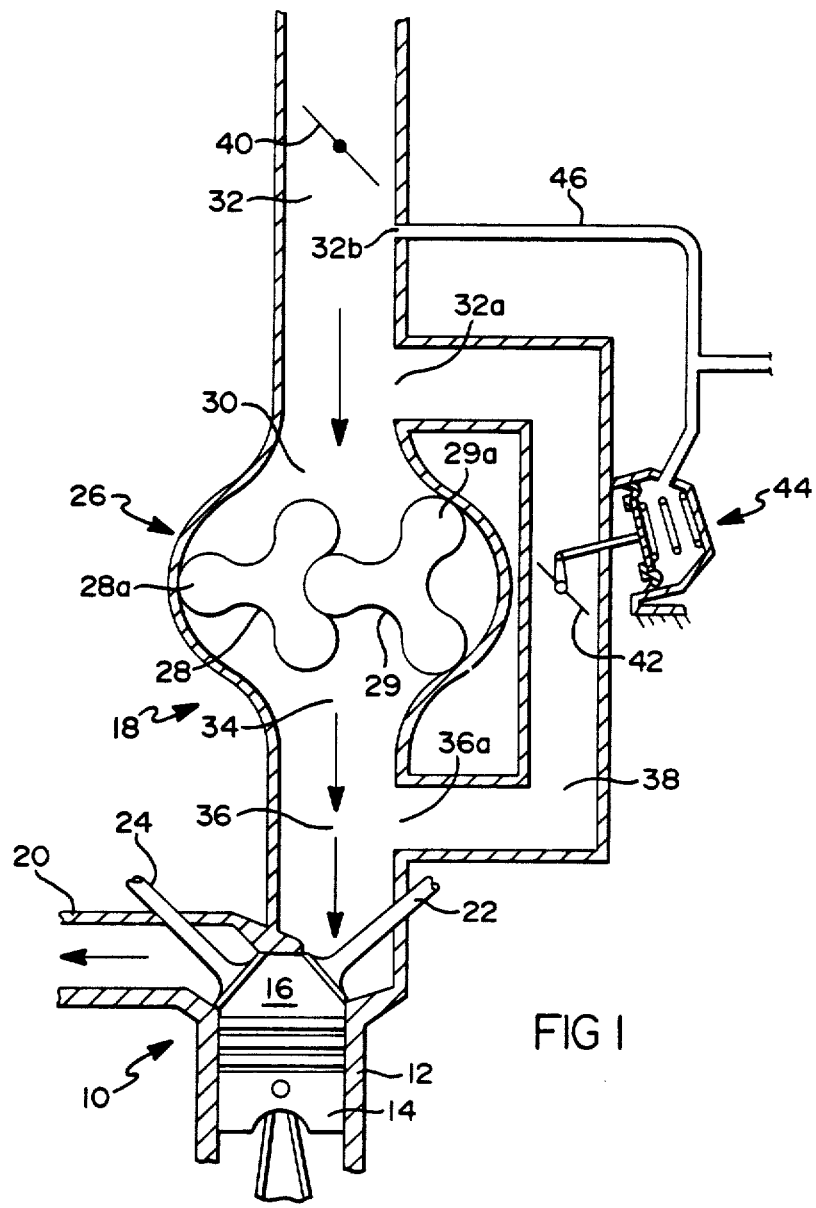
FIG. 1 schematically illustrates an intake manifold assembly having a positive displacement, backflow type blower or supercharger therein for boosting pressure to an internal combustion engine.

Referring first to FIG. 1, therein is schematically illustrated a portion of an internal combustion engine 10 which is preferably of the periodic combustion type such as the Otto or Diesel cycle type. The engine includes a plurality of cylinders 12 and a reciprocating piston 14 disposed within each cylinder to define an expandable combustion chamber 16. The engine includes intake and exhaust manifold assemblies 18,20 for respectively directing combustion air to-and-from the combustion chambers via intake and exhaust valves 22,24.

The intake manifold assembly 18 includes a positive displacement blower 26 of the backflow or Roots-type having a pair of rotors 28,29 with meshed lobes 28a,29a. The rotors may be mechanically driven by engine crankshaft torque transmitted thereto in known manner via an unshown drive belt. The mechanical drive rotates the blower rotors at a fixed ratio relative to crankshaft speed and such that the blower displacement is greater than the engine displacement, thereby boosting or supercharging the air going to the engine combustion chambers to increase engine power.

The supercharger includes an inlet port 30 receiving an air or air-fuel mixture charge from an inlet duct or passage 32 and a discharge or outlet port 34 directing the charge to the intake valves 22 via a discharge duct or passage 36. The intake and discharge ducts are intercommunicated via a bypass duct or passage 38 connected at openings 32a,36a in the intake and discharge ducts 32,36, respectively If the engine 10 is of the Otto cycle type, a throttle valve 40 preferably controls air or air-fuel mixture flow into intake duct 32 from a source, such as ambient or atmospheric air, in a well known manner.

Disposed within the bypass duct is a bypass valve 42 which is moved between open and closed positions by an actuator assembly 44 responsive to pressure in inlet duct 32 via a line 46 and therefore operative to control supercharging pressure in duct 36 as a function of engine power demand. When bypass valve 42 is in the fully open position, the air pressure in discharge duct 36 is relatively low or a minimum relative to the air pressure in intake duct 32. When the valve is fully closed, the air in the discharge duct is relatively high.

Looking now at FIGS. 2-5, therein is shown a portion of blower 26 in detail. The shown portion includes a housing assembly 48, a rotor assembly 50, an input drive assembly 52, and a torsion damping assembly 54. The housing assembly includes a main housing section 56 and an input drive section 58 secured together by a plurality of bolts 60 and defining therebetween a gear chamber 62 which normally contains a lubricating oil. The main housing section 56 defines a rotor chamber 64 separated from the gear chamber by an end wall portion 56a having stepped through bores 56b,56c for supporting anti-friction bearings 66 and dynamic seals 68. Main housing section 56 also defines inlet and outlet ports 30,34 and a second unshown end wall portion for closing the left end of chamber 64 and supporting bearings similar to bearings 66.

The rotor assembly 50 includes the rotors 28,29, shafts 70,71 fixed to the rotors and supported at both ends by bearings such as bearing 66, and meshed timing gears 72,74 pressed on the right ends of shafts 70,71 and operative to prevent contact of meshing rotor lobes 28a,29a. Rotors 28,29, like housing assembly 48, are preferably formed of a light-weight material, such as aluminum alloy. The rotors may include any number of lobes; herein each rotor includes three lobes 28a,29a. The lobes may be straight, as shown in FIG. 1, or helical, as shown in FIG. 2. A more detailed description of the main housing section and rotor assembly may be found in U.S. Pat. No. 4,638,570 which is incorporated herein by reference.

Input drive assembly 52 includes a shaft 76 supported by anti-friction bearings 78 and axially aligned with the axis of shaft 70, a dynamic seal 80, a pulley 82 secured to shaft 76 by a key 84 and a nut 86, an annular end member 88 pressed on the left end of the shaft, and a spring 98 leftwardly biasing the leftwardly disposed bearing 78 against a shoulder 88a of end member 88 to prevent bearing flutter. Pulley 82 is driven by the previously mentioned and unshown belt which transmits engine torque.

During non-supercharging, low engine speed operation the meshed teeth of the timing gears are substantially unloaded and have been known to bounce or clash back and forth against each other through the backlash therebetween. The bounce or clash produces an objectional noise known as gear rattle and is believed to be caused by torsionals in the supercharger drive torque provided by periodic combustion engines such as engine 10. The resilient drive provided by torsion damping assembly 54 reduces the rattle noise below the audible range.

Torsion damping mechanism or assembly 54 includes an annular member 92, two sets of three axially extending pins or drive means 94,96, and a torsion spring 98. Annular member 92 is disposed for rotation about the common axis of shafts 70,76 and includes a central opening 92a, three circumferentially spaced apart through bores 92b, and three circumferentially spaced apart through slots 92c of arcuate shape interspaced between the through bores. Through bores 92b and slots 92c are radially spaced from and extend parallel to the common axis Pins 94 are press fit at one end into bores 74a of gear 74 and are press fit at the other end into through bores 92b of annular member 92. Pins 96 are press fit at one end into bores 88b of end member 88 and slidably received at the other end by arcuate slots 92c. Pins 96 and slots 92c may be provided with an amount of radial free play therebetween to mitigate the effects of misalignment of shafts 52,70 and/or the components therebetween. Torsion spring 98 includes helically wound coils 98a disposed in central opening 92a of annular member 92 and opposite ends or tangs 98b,98c extending radially outward and looped around a portion of ones of the pins 94,96. Tangs 98b,98c are disposed in arcuate recesses 92d,92e on axially oppositely facing sides of member 92. Herein, the tangs are attached to adjacent pins 94,96; alternatively, the tangs may be disposed in radially opposite directions for balance purposes and/or, tang 98b may be grounded at any position to annular member 92.

Ends 92f,92g of slots 92c define positive stops which limit rotation of input drive 52 relative to timing gear 74 and tangs 98b,98c preferably position pins 96 between the stops during no load conditions. Alternatively, torsion spring 98 may be replaced by other types of resilient means, e.g., circumferentially disposed compression springs. Herein, by way of example only, maximum relative rotation is limited to 30 rotational degrees in the clockwise drive direction of input drive 52 (see arrow A in FIG. 5) and to 20 rotational degrees in the counterclockwise direction; good results were provided by a spring having a rate of ⅛ inch pounds per degree. Slots 92c and torsion spring 98 are sized to provide drive between the input drive and gear 74 via the resilient force of spring 98 when engine 10 is operating at relatively low speeds (such as idle) and the outlet port air pressure is relatively low (i.e., low relative to inlet port air pressure). Such relatively low output port pressures, of course, occur during non-supercharging modes of operation when bypass valve 42 is fully or substantially fully open.

Spring 98 and slots 92c are preferably sized such that pins 96 do not normally engage or slap against stops 92f,92g during non-supercharging, low engine speed operating conditions. Such engagement free operation is not readily obtainable with engines having relatively high amplitude torsionals at idle or low speed operation. Such torsionals are in general known to be inversely proportional to the number of engine cylinders. Noise associated with slap engagement of pins 96 against stop 92f and/or stop 92g may be mitigated by providing the stop(s) with a resilient bumper, such as stops 92f', 92g' formed of an elastomer 100 in the fragmentary view of FIG. 5a. Elastomeric 100 may be a polyester thermoplastic elastomer. Futher, the arc length of slots 92c and the rate of spring 98 may vary with different size engine/supercharger combinations and/or the torque characteristics of the engine FIG. 6 illustrates an alternative embodiment torsion damping assembly 154, therein elements corresponding substantially to elements in FIGS. 3-5 are prefixed with a one. Slots 192c are reduced to thirty degrees, torsion spring 198 is preloaded, and tang 198c is not secured to pin 196. In this emobdiment, the preload of spring 198 maintains pins 196 against stops 192f during no load conditions, i.e., when the engine is not in operation. The preload and rate of spring 198 allows pins 196 to assume a position between stops 192f, 192g when the engine is operating at relatively low speeds and blower 26 is not in the supercharging mode of operation. It should be recognized that the length of the slots, preload of the spring, and the rate of the spring may vary for the same general reasons given with respect to the damping assembly of FIGS. 3-5. By way of example only, spring 198 has the same rate as spring 98 and has a six degree or two pound preload.

A preferred embodiment of the invention has been disclosed herein for illustrative purposes. Many variations and modifications of the disclosed embodiment are believed to be within the spirit of the invention. The following claims are intended to cover inventive portions of the disclosed embodiment and variations and modifications believed to be within the spirit of the inventive portions.

What is claimed is:

1. A rotary blower of the backflowtype including a housing; first and second rotors rotatably disposed in the housing and having meshed lobes for transferring relatively low pressure inlet port air to outlet port air controllable between relatively low and high pressures; first and second meshed timing gears respectively fixed to the first and second rotors for preventing contact of the meshed lobes and positioned for rotation about an axis common to the axis of their respective rotor; an input drive adapted to be rotatably driven about an axis common to the first timing gear and in one direction at speeds proportional to speed of a periodic combustion torque transmitting engine selectively controllable between relatively low and high speeds; the improvement comprising:

- a torsion damping mechanism including drive means driven by the input drive and mounted for limited rotation relative to the first timing gear and resilient means drivingly interposed between the drive means and the first timing gear, said resilient means being flexibly operative to attenuate input drive torsionals in the torque and thereby reduce timing gear rattle, said damping mechanism further including:
- an annular member positioned for rotation about the first timing gear axis and including at least first and second circumferentially spaced apart openings radially spaced from the first timing gear axis;
- first and second drive pins respectively fixed at one end to the input drive and the first timing gear and received at the other end by one of the openings, the pin received by the first opening being free to move arcuately therein and the pin received by the second opening retained against such arcuate movement; and
- said resilient means including a torsion spring having helical wound coils disposed in a central opening of said annular member, the opposite ends of the spring having first and second tangs extending radially outward, the first tang being positioned for contact with the pin free to move arcuately in the first opening and the second tang being secured against movement relative to the annular member.

2. The blower of claim 1, wherein the first and second tangs are respectively secured to the first and second pins.

3. The blower of claim 2, wherein the first opening is an arcuate slot.

4. The blower of claim 1, wherein the annular member is formed of a plastic material.

5. The blower of claim 1, wherein the first opening including circumferentially spaced apart ends defining stop means engagable by the pin therein for limiting flexing of the torsion spring to a predetermined range and for providing driving connection between the input drive and the first timing gear, said torsion spring having a torque transmitting capacity in said predetermined range substantially less than the torque required to drive the timing gears when the outlet port pressure is relatively high, and said torsion spring having a relatively low spring rate in said predetermined range for attenuating input drive torsionals and reducing timing gear rattle when the outlet port pressure is relatively low.

6. The blower of claim 5, wherein at least some of said stop means include resilient means for cushioning the impact of said pins thereagainst.

7. A rotary blower of the backflowtype including a housing; first and second rotors rotatably disposed in the housing and having meshed lobes for transferring relatively low pressure inlet port air to outlet port air; valve means for controlling the outlet port air between relatively low non-supercharged pressures and relatively high supercharged pressures; first and second meshed timing gears respectively fixed to the first and second rotors for preventing contact of the meshed lobes; an input drive adapted to be rotatably driven about an axis in one direction at speeds proportional to speed of a periodic combustion torque transmitting engine selectively controllable between relatively low and high speeds; the improvement comprising:

- a torsion damping mechanism including drive means driven by the input drive and mounted for limited rotation relative to the first timing gear, resilient means for flexibly interconnecting the drive means and the first timing gear, stop means engagable for limiting flexing of the resilient means to a predetermined range for providing driving connection between the input drive and the first timing gear, said resilient means having a torque transmitting capacity in said predetermined range substantially less than the torque required to drive the timing gears when outlet port air is at the supercharged pressures, and said resilient means having a relatively low spring rate in said predetermined range for attenuating input drive torsionals and reducing timing gear rattle when the outlet port air is at substantially non-supercharged pressures; and
- said damping mechanism including an annular member secured to said first timing gear and having at least one arcuate slot with ends defining said stops, said drive means includes at least one pin fixed at one end to the input drive and at the other end loosely received by said slot and said torsion spring having one end secured against movement relative to the first timing gear and at another end secured against movement relative to said pin.

8. The blower in claim 7, wherein the stop means including first and second circumferentially spaced apart stops for limiting maximum relative rotation and said stops being sufficiently spaced apart to be normally inoperative to limit said relative rotation when said engine is operating at said relatively low speeds and said outlet port air pressure is relatively low.

9. The blower of claim 7, wherein at least some of said stop means include resilient means for cushioning the impact of said pins thereagainst.

10. The blower of claim 7, wherein said at least one slot and pin received thereby have a predetermined amount of radial free play therebetween.

11. The blower of claim 7, wherein said torsion spring is provided with a predetermined amount of preload for biasing said at least one pin, received by said slot, counter to the direction of rotation the damping mechanism and against one of said stops during non-rotation of the damping mechanism.

* * * * *